J. H. Lyon,
Seal Lock.
No. 29,181.   Patented July 17, 1860.
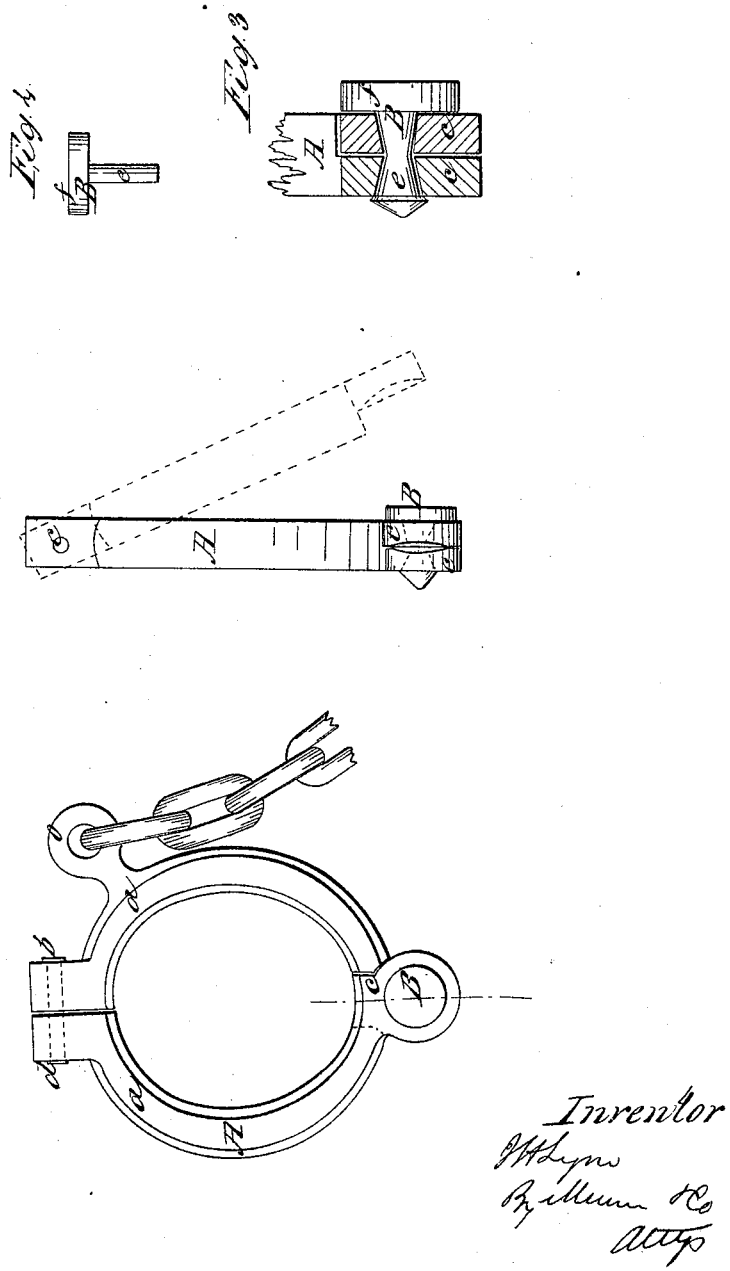
Witnesses
Peter Cooke
W. Tusch
Inventor
J H Lyon
By Munn & Co
Attys

UNITED STATES PATENT OFFICE.

JOHN H. LYON, OF NEW YORK, N. Y.

SEAL-LOCK FOR RAILWAY-CARS.

Specification forming part of Letters Patent No. 29,181, dated July 17, 1860; Reissued February 6, 1872, No. 4,734.

*To all whom it may concern:*

Be it known that I, JOHN H. LYON, of the city, county, and State of New York, have invented a new and Improved Metallic Seal-Lock; and I do hereby declare that the following is a full, clear, and exact description of the same, reference being had to the annexed drawings, making a part of this specification, in which—

Figure 1, is a side elevation of my invention. Fig. 2, an edge sectional view of the same. Fig. 3, an enlarged sectional edge view of that portion through which the seal passes. Fig. 4, a detached view of a rivet or seal.

Similar letters of reference indicate corresponding parts in the several figures.

To enable those skilled in the art to fully understand and construct my invention I will proceed to describe it.

A, represents a shackle which is made of metal and formed of two equal parts $a, a$, connected at one end by a hinge or joint $b$, the opposite ends $c$, being flattened in circular form and so arranged as to lap over each other or come in contact when the parts of the shackle are closed. This will be fully understood by referring to Figs. 2 and 3.

The circular ends $c$, of the shackle are perforated with a hole to receive the seal or rivet B, which is of lead, pewter, or other soft metal. This seal or rivet is of the usual rivet form it having a cylindrical shank $e$, provided with a head $f$, as shown clearly in Fig. 4.

The seal is compressed and the lock locked by passing the seals through the holes in the ends $c$, and then compressing the seal between the jaws of a pair of pincers of any proper form, or by submitting the seal and ends to pressure in a suitable hand press.

The hole through the circular ends $c$, which receives the rivet is made beveled in form and by the pressure of the pincers or other instrument the metal of the seal is made to fill this hole so that when any instrument is applied between the ends $c$, to force apart said ends and thus to open the lock, the heads of the rivet cannot break off, but the rivet must break in its central part before the lock can be opened. If the hole were not beveled the smaller rivet head might draw through, and the same rivet could be used to refasten the lock and detection be thus avoided. By having the rivet hole beveled as described it is impossible to separate the ends $c$, after the rivet has been compressed even if the smaller rivet head were cut off flush with the end of the shackle.

The shackle A, has a hole $o$, formed in an ear or projection, through which a chain passes to secure the shackle to the article which it locks or to adjacent parts of the car or door in order to prevent its being lost. The shackle may be passed through a staple precisely similar to the shackle of a pad lock the parts $a, a$, of the shackle being opened or distended sufficiently to allow one of the parts to pass through the staple. A rivet or seal B, is then applied to the shank $e$, being passed through the holes of the circular ends $c$. The pincers or pressing tool is then applied and the rivet or seal B, compressed as before described. In order to open the shackle the seal or rivet must of course be broken or severed and this is done by pressing a thin blade of steel between the circular ends $c, c$, of the shackle and dividing or breaking the shank $e$.

By reference to Fig. 2, it will be observed that the edges of the ends $c, c$, are beveled so as to admit the entrance of a blade for forcing the same apart. This beveling serves to guide the separating instrument and assists the commencement of the operation of opening and prevents the ends $c, c$, from being damaged by being cut by the blade or other instrument used in the opening. As legitimate operators are only supplied with pincers or pressing tool, and rivets or seals B, it will be seen that the shackle cannot be opened and resealed by an employee.

I would remark that although the shackle A, has been described as being formed of two parts connected by a hinge or joint $b$, still it may be formed of one piece and possess a requisite degree of elasticity to admit of the ends $c$, being distended sufficiently to allow the shackle to be fitted in its staple.

I do not claim broadly the making of a shackle in one piece of soft metal the ends of which are sealed together by pressure; nor do I claim the formation of a seal by inserting the ends of a wire or rod in a soft metallic seal and uniting them by pressure as both of these features are shown in the patents of Messrs. Mears and Houlton 1857; nor do I claim broadly the invention of a lock secured by a seal of soft metal as that is shown in my own patent reissued 1859; but—

Having thus described my invention what I claim as new and desire to secure by Letters Patent is—

1. The combination with the ends *c, c*, of shackle A, of the soft metallic rivet B, as and for the purpose herein shown and described.

2. Beveling the ends *c, c*, of the shackle A, as and for the purpose herein shown and described.

3. Making the hole in the shackle which receives the fastening rivet of conical or beveled form so that by the act of opening the rivet cannot draw through the hole but will break in or about its middle as and for the purpose herein shown and described.

JOHN H. LYON.

Witnesses:
J. W. COOMBS,
R. S. SPENCER.